United States Patent [19]

Müller et al.

[11] Patent Number: 5,347,354
[45] Date of Patent: Sep. 13, 1994

[54] SAGNAC-TYPE OPTICAL FIBER GYROSCOPE HAVING DEPOLARIZERS OF DIFFERING LENGTHS

[75] Inventors: Reinhard Müller, Puchheim; Engelbert Hartl; Gert Trommer, both of München, all of Fed. Rep. of Germany

[73] Assignee: Deutsch Aerospace, Ottobrun, Fed. Rep. of Germany

[21] Appl. No.: 902,237

[22] Filed: Jun. 22, 1992

[30] Foreign Application Priority Data

Jun. 22, 1991 [DE] Fed. Rep. of Germany ....... 4120675

[51] Int. Cl.$^5$ ............................................. G01C 19/72
[52] U.S. Cl. ................................................. 356/350
[58] Field of Search ................ 356/350, 345; 385/12, 385/14

[56] References Cited

U.S. PATENT DOCUMENTS

| | | | |
|---|---|---|---|
| 4,653,917 | 3/1987 | Moeller et al. | 356/350 |
| 4,712,306 | 12/1987 | Cahill et al. | 356/350 |
| 4,944,590 | 7/1990 | Poisel et al. | 356/350 |

FOREIGN PATENT DOCUMENTS 3805905 2/1988 Fed. Rep. of Germany ...... 356/350

Primary Examiner—Samuel A. Turner
Attorney, Agent, or Firm—Evenson, McKeown Edwards & Lenahan

[57] ABSTRACT

A sagnac-type fiber optic gyroscope in which depolarizers are connected to both ends of the fiber coil and are then connected with the outputs of a 3×3 directional coupler.

7 Claims, 2 Drawing Sheets

SAGNAC-TYPE OPTICAL FIBER GYROSCOPE HAVING DEPOLARIZERS OF DIFFERING LENGTHS

BACKGROUND AND SUMMARY OF THE INVENTION

The present invention relates to a sagnac-type fiber optic gyroscope of the generic type disclosed, for example, in U.S. Pat. No. 4,653,917 or the German Patent Document DE-OS 38,05,905.

In the case of fiber optic gyroscopes of this type, light sources are used which emit nonpolarized light in a broad frequency band, as discussed for example in the above-mentioned U.S. patent. Alternatively, superluminescent diodes can be used which emit space-coherent light with wavelengths of between 10 and 20 nm. According to German Patent Document DE-OS 38,05,905, a less expensive solution, which provides improved measuring stability over long periods of time, consists of edge-emitting luminescent diodes, multimode laser diodes with a fiber optical depolarizer or superfluorescent monomode optical fibers with a semiconductor pumped-light source.

The essay by Trommer, Hartl, Müller, et al. in APPLIED OPTICS, Volume 29, No. 36, of Dec. 20, 1990, Pages 5360 to 5365, discloses function equations to determine the rate of 20 rotation of a fiber optic gyroscope according to the abovementioned German Patent Document DE-OS 38,05,905 by measurement of its sagnac phase. (See equations (18a), (18b), (18c) and (26).) The rate of rotation is indicated as a function of different parameters, such as the characteristics of the particular 3×3-coupler, the sensitivity of the receiving diodes, the damping of the fiber coil and the Sagnac phase. This function equation is independent of the intensity of the light source and the contrast of the interference signal (which is a function of the characteristics of the fiber coil). The equation for the rate of rotation indicated there, however, is valid only as long as the contrast of the interference signal generated in the coupler does not become zero, which will be true when the fiber of the fiber coil has perfectly polarization-preserving characteristics. For this reason, polarization-preserving monomode fibers are used for such a fiber optical gyroscope. However, the manufacturing costs for these fibers are high.

When fiber coils are wound from fibers which do not preserve polarization (and are thus inexpensive to manufacture), it is possible for the contrast of the interference signal to become zero, in which case the measuring of the rate of rotation yields no usable results. To preclude such circumstances, it is known to splice a fiber depolarizer to an end of the fiber coil made of fibers which do not preserve any polarization; compare R. Ulrich: "Polarization and Depolarization in Fiber Optic Gyroscopes, Fiber Optic Rotation Sensors and Related Technologies", Pages 52–77, Springer-Verlag Berlin-Heidelberg (1982). This fiber depolarizer comprises at least two portions of linear birefringent, that is polarization-preserving, fibers which are spliced to one another in such a manner that the main axes of two adjacent fiber portions enclose an angle of 45° with one another. The fibers are dimensioned such that their lengths, and the differences of the lengths of the fiber portions, are larger than the depolarization length of the polarizationpreserving fibers; compare for this purpose: K. Böhm, K. Petermann: "Performance of Light Depolarizers with Birefringent Single-Mode Fibres" J-LT (1), Pages 71–74 Simple instructions for building a depolarizer which correspond to this rule are: The shortest fiber length must be larger than the depolarization length, and each additional fiber portion must be twice as long as the preceding one; in this case, the sequence in which the fiber portions are spliced is not important.

The above-mentioned function equation for the determination of the rate of rotation of the fiber optic gyroscope also contains a term which offsets the measured value due to polarization in the fiber coil. This term disappears, however, when the fiber optic gyroscope is operated with light which has the polarization degree of zero, in which case a depolarizer is also required on one end of the fiber coil, to stabilize the contrast. In addition, the above-mentioned offset will change when the polarization condition of the light is changed and not only when the degree of polarization of the used light is changed. When fibers are used which do not preserve any polarization, the polarization condition is more sensitive to environmental conditions: slight temperatures changes result, for example, in significant changes in the residual birefringence of the used fibers and, by way of the polarization conditions, in changes in the offset.

The use of nonpolarized light does not assure disappearance of the offset if the polarization is generated in the fiber optical gyroscope itself. Moreover, it has now been found that specifically nonbirefringent fibers, if wound into a coil, can polarize nonpolarized input light. This effect is based, for example, on the fact that the coil has a different damping for light that is polarized in the coiling plane than for light that is salarized perpendicularly to the coiling plane. Furthermore, the resulting polarization of the light is not eliminated when an ideal depolarizer is used with a complete depolarization at one end of the fiber coil corresponding to the above-mentioned state of the art for the stabilization of the contrast: On the contrary, if extremely precise measured values are expected, additional measures must be provided to compensate the effect of a polarizing fiber coil when fibers which do not preserve any polarization are used.

It is therefore an object of the invention to provide a fiber optic gyroscope of the mentioned type which may also be produced from fibers which are inexpensive to manufacture and do not preserve any polarization, and which reliably prevents an additional polarization of the light emitted by the light source.

This object is achieved according to the invention which is based on the principle that the offset due to polarization generated in the fiber coil can be prevented if such polarization is eliminated before the light reaches the 3×3 coupler where the two light sources, which pass through the fiber coil in the opposite direction, interfere with one another. Correspondingly, a depolarizer, such as a fiber depolarizer of the above-mentioned type, is also spliced to the second end of the fiber coil. In the case of a fiber depolarizer, all sections of the fibers of both depolarizers must meet the above-indicated rule concerning the fiber lengths of a single depolarizer.

A fiber optic gyroscope consisting of a fiber coil, wound from nonbirefringent fibers and two depolarizers may also be operated by means of a light source which furnishes polarized light. When ideal depolarizers are used, the offsetting becomes zero; in the case of technically implementable (that is, nonideal) depolarizers which do not completely depolarize the beamed-in light, a slight offset remains, but does not significantly influence the measuring result. The amount of the offset depending on the quality of the depolarizers.

Other objects, advantages and novel features of the present invention will become apparent from the following detailed description of the invention when considered in conjunction with the accompanying drawings.

DETAILED DESCRIPTION OF THE DRAWINGS

Figure 1:
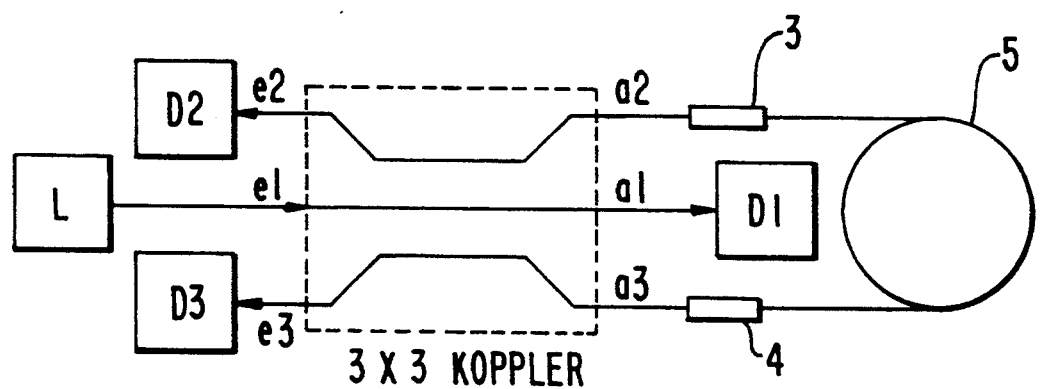
FIG. 1 illustrates schematically a fiber optical gyroscope according to the invention.

Referring to FIG. 1, a fiber optic gyroscope 1 comprises a 3×3 directional coupler 2 with three inputs e1, e2 and e3 as well as three outputs a1, a2 and a3. The connecting fiber of a light source L is connected with the center input e1 and emits nonpolarized light in a broad frequency band. The fiber connection pieces of two radiation detectors D2 and D3 are connected with the inputs e2 and e3 which are situated symmetrically with respect to this input e1.

Connected with the first center output a1 of the 3×3 coupler is a radiation detector D1, which detects intensity fluctuations of the light source as well as changes of the coupling characteristics of the 3×3 coupler, and is used for the corresponding compensation. Fiber depolarizers 3 and 4 respectively are connected to the outputs a2 and a3 which are situated symmetrically with respect to this central output a1. As mentioned above, the fiber depolarizers are spliced together of several sections of birefringent, that is, polarization preserving fibers, the lengths of which are adapted to one another and, in each case, are larger than the depolarization length of the used fibers preserve polarization.

Figure 2:
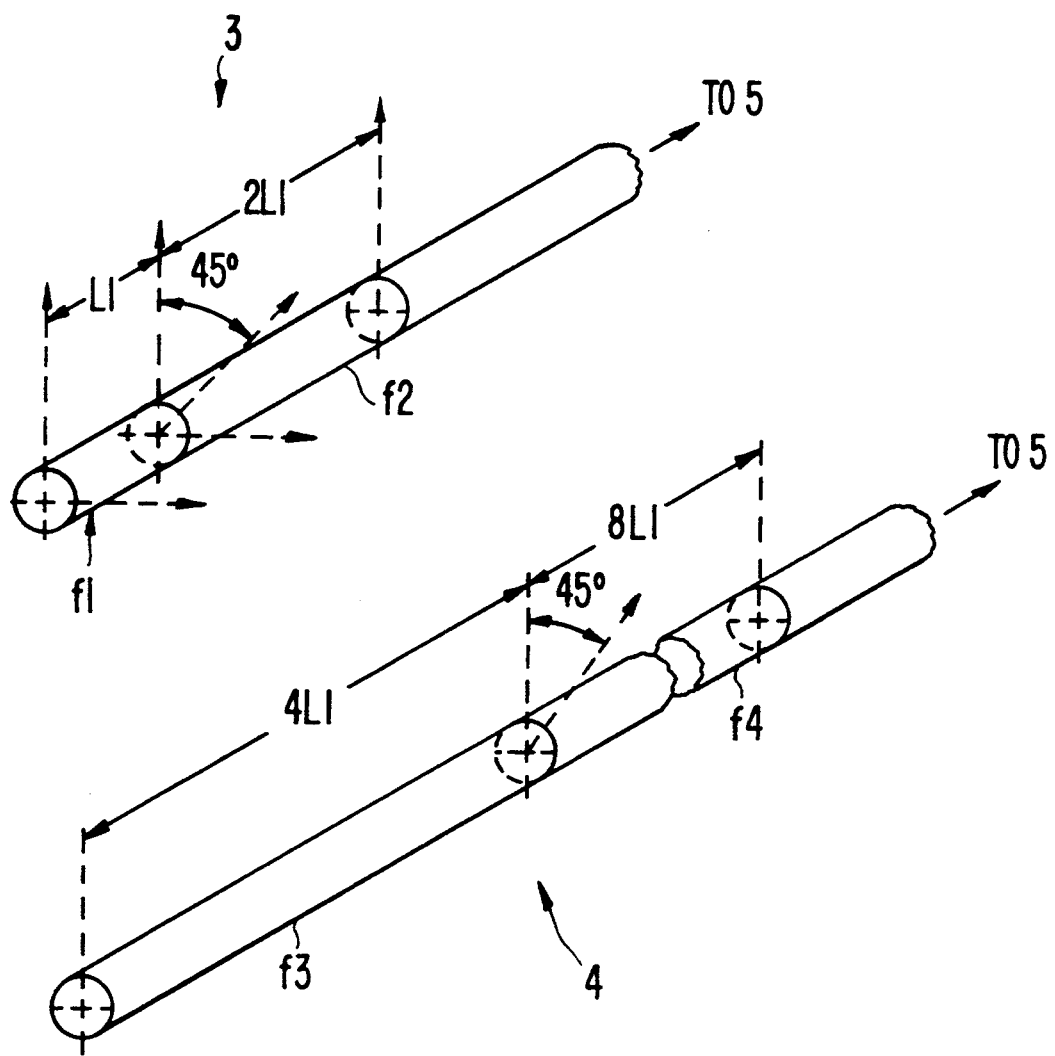
FIG. 2 shows in detail the configuration of the depolarization of the gyroscope.

As shown in FIG. 2 the depolarizers 3 and 4 are each composed of two fiber sections f1, f2 and f3, f4, respectively. The lengths of the individual fiber sections are L1, 2L1, 4L1, and 8L1, therefor at a ratio of 1:2:4:8. The main axes of two adjacent fiber sections f1, f2 and f3, f4 respectively enclose an angle of 45° with one another. The ends of a fiber coil 5 are spliced to the depolarizers 3 and 4. The fiber coil 5 comprises a wound fiber which has characteristics which do not preserve polarization. The fibers are, for example, nonbirefringent monomode fibers.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A Sagnac-type fiber optic gyroscope comprising:
a 3×3 coupler having three inputs and three outputs;
a fiber optic waveguide coil comprising an optical fiber having two ends which are optically coupled respectively to two of the three outputs of the 3×3 coupler,
a light source optically coupled to one of said inputs of the coupler; and
two radiation detectors optically coupled to the other two inputs of the coupler; and
first and second fiber depolarizers arranged between respective ends of the fiber optic waveguide coil and the respective outputs of the 3×3 coupler to which they are coupled, each of said fiber depolarizers comprising at least two sections of birefringent fiber optic waveguides spliced to one another with the main axes of two adjacent fiber sections enclosing a predetermined angle of 45°;
wherein length of the fiber sections are all different, and length differences between fiber sections are, in each case, larger than a depolarization length of the birefringent fiber optic waveguides.

2. A fiber optic gyroscope according to claim 1, wherein the lengths of the respective fiber sections of each depolarizer are at a ratio of 1:2:4:8.

3. A fiber optic gyroscope according to claim 1, wherein the fiber optic waveguide coil is composed of a nonbirefringent monomode fiber optic waveguide.

4. A fiber optic gyroscope according to claim 1, wherein a light source which emits nonpolarized light in a broad frequency spectrum is provided for the fiber optic gyroscope.

5. A fiber optical gyroscope according to claim 1, wherein said light source emits polarized light.

6. A fiber optic gyroscope according to claim 2, wherein said light source emits polarized light.

7. A fiber optic gyroscope according to claim 3, wherein said light source emits polarized light.

* * * * *